(12) United States Patent
Bickel et al.

(10) Patent No.: US 7,271,887 B2
(45) Date of Patent: Sep. 18, 2007

(54) SUNLIGHT MEASURING DEVICE

(75) Inventors: William C. Bickel, Jefferson, ME (US); James E. Richardson, Eliot, ME (US)

(73) Assignee: Suncalc Corporation, Lakeville, CT (US)

( * ) Notice: Subject to any disclaimer, the term of this patent is extended or adjusted under 35 U.S.C. 154(b) by 140 days.

(21) Appl. No.: 11/204,944

(22) Filed: Aug. 16, 2005

(65) Prior Publication Data

US 2006/0038983 A1    Feb. 23, 2006

Related U.S. Application Data

(60) Provisional application No. 60/602,008, filed on Aug. 17, 2004.

(51) Int. Cl.
*G01J 1/42* (2006.01)
(52) U.S. Cl. .................. 356/218; 356/227; 356/225
(58) Field of Classification Search .............. 356/128, 356/149, 416, 432, 213–227; 250/226, 210
See application file for complete search history.

(56) References Cited

U.S. PATENT DOCUMENTS

| | | |
|---|---|---|
| 1,725,651 A | 8/1929 | Koller |
| 2,782,088 A | 2/1957 | Davis, Jr. |
| 3,198,945 A | 8/1965 | Dewes et al. |
| 3,405,274 A | 10/1968 | Lakin |
| 3,418,479 A | 12/1968 | Schmitt |
| 3,569,717 A | 3/1971 | Awojobi et al. |
| 3,617,137 A | 11/1971 | Meyers |
| 4,015,116 A | 3/1977 | Bahm |
| 4,110,049 A | 8/1978 | Younskevicius |
| 4,218,139 A * | 8/1980 | Sheffield .................. 356/218 |
| 4,253,764 A | 3/1981 | Morrill |
| 4,491,727 A | 1/1985 | Appelbaum et al. |
| 4,678,330 A | 7/1987 | Gutschick et al. |
| 6,114,687 A * | 9/2000 | Sharp et al. .......... 250/214 AL |
| 6,774,988 B2 * | 8/2004 | Stam et al. ................ 356/218 |
| 2004/0016865 A1 | 1/2004 | Little |

* cited by examiner

*Primary Examiner*—Hwa Lee
*Assistant Examiner*—Tri Ton
(74) *Attorney, Agent, or Firm*—Patricia M. Mathers

(57) ABSTRACT

A sunlight measuring device that quantifies the accumulation of light at a particular site. The sunlight measuring device is a battery-operated device mounted on a stake for easy insertion into the ground. The device is placed at the intended site for growing a plant. The light that falls on the sunlight measuring device over a period of time is accumulated and the light accumulation is represented by a visual signal that indicates one of four light conditions: full sun, partial sun, partial shade, full shade.

18 Claims, 5 Drawing Sheets

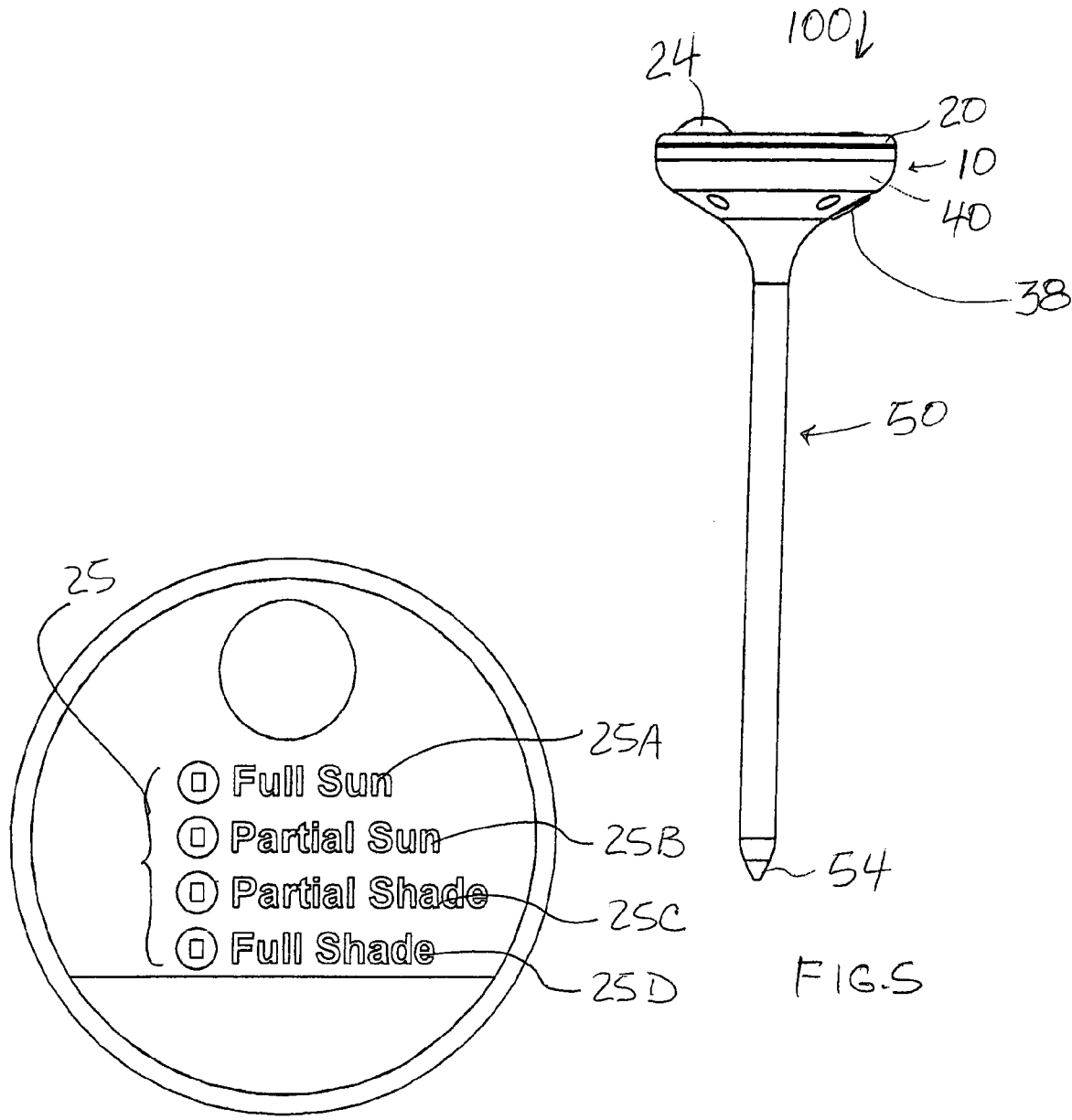

SUNLIGHT MEASURING DEVICE

BACKGROUND INFORMATION

1. Field of the Invention

The invention relates to the field of devices that measure solar radiation. More specifically, this invention relates to a device that measures the amount of accumulated sunlight that is received at a specific location over a particular period of time.

2. Description of the Prior Art

All plants require some level of sunlight in order to grow and thrive. Evolution has created differences in the cell structure of plants and, as a result, different plants require different light conditions to grow. Some plants require full sunlight conditions throughout the day while others thrive in total shade.

Gardeners and landscapers are well aware of the need to match the light requirements of a plant with the light condition of specific planting site, but often lack the necessary tools to accurately measure accumulated sunlight conditions at the site over a period of time. The information typically provided on the label of a garden plant is very general, and with regard to the light condition required for the plant to thrive, the information is usually indicated only as: full sun, partial sun, partial shade, or full shade. It would be most helpful to gardeners to have a device that provides information about light conditions in terms that correspond to the terms used on the label and used by the general gardening public.

Sunlight measuring devices are widely available for use by professional photographers and gardeners. Many of these devices make spot measurements of light intensity at an instant in time. This information is of little value to a gardener, who needs to know the accumulated light condition of a particular site throughout the day. Other devices measure accumulated sunlight over a period of time, but provide the information in a form that is difficult for gardeners to evaluate, such as in sols/h and total sols per selected period of time. This requires that the gardener know how to equate the sols/h information with the usual light conditions indicators of full sun, partial sun, etc. that are typical for the garden industry. Still other devices are complicated to use because they require some data input effort on the part of the user.

What is needed, therefore, is a device that calculates accumulated sunlight over a given period of time at a particular site and presents the sunlight information to the gardener in gardener's terms that are comparable to the information on the typical plant label.

BRIEF SUMMARY OF THE INVENTION

For reasons cited above, it is an object of this invention to provide a device that accurately measures the amount of accumulated light that falls at a particular site and provides information on the general light condition at that site over a 24 hour period of time. It is a further object to provide such a device that displays the information in terms that relate directly to the sunlight tolerance recommendations provided by nurseries and garden centers on most plant labels.

The objects are achieved by providing a sunlight measuring device that measures over a period of time the accumulated light that falls on the site in which the device is placed and that provides an indication of the general light condition of that site in gardener's terms. The sunlight measuring device according to the invention has a sunlight collector lens for funneling light to a light sensor, and four light condition indicators labeled "Full Sun", "Partial Sun", "Partial Shade", and "Full Shade". The light sensor collects available sunlight/solar radiation and converts the energy from the light into an electronic signal (voltage or current) in direct proportion to the intensity and duration of the light received by the sensor. A microprocessor calculates an accumulated light value based on the accumulated magnitude of the signal from the light sensor, compares the accumulated light value with four light thresholds that correspond to the four light conditions full sun, partial sun, partial shade, and full shade, and, as a function of the light threshold reached, activates the corresponding light condition indicator.

The sunlight measuring device according to the invention measures for a predetermined period of time, typically, a period of 24 hours. Ideally, the device is used on a day with continual sunshine throughout the day. When initially turned on, each of the light condition indicators is sequentially activated, to indicate to the user that the unit is turned on and functioning properly. The sunlight measuring device samples sunlight and accumulates data for an initial accumulation period of time. It then processes the data to determine how much total light has accumulated and compares the total light to predetermined light thresholds, to determine which light threshold has been reached. It then activates the light condition indicator of the corresponding light threshold. The initial accumulation period is typically 12 hours. The sunlight measuring device stops accumulating data after the predetermined time period, but the light condition indicator remains activated, so the user can see the results. If the device is left on beyond the predetermined time period, it shuts off completely after a shut-off period has lapsed, to conserve power. This shut-off period may lapse 24 or 36 hours, for example, after the initial power up of the device. The accumulated light data is retained in memory. The last threshold level that was achieved is ascertainable by pressing the on/off button, which again activates the particular light condition indicator that corresponds to that threshold level.

The sunlight measuring device filters the light, in order to isolate, record, and accumulate only photosynthetically active radiation (PAR) at wavelengths of 400 nm to 700 nm. This is because only photons in the PAR region of the color spectrum are active in creating photosynthesis.

The sunlight measuring device may be used indoors or outdoors. The most accurate measurement of outdoor light conditions is obtained by measuring at least eight hours of daylight on a sunny day. The sunlight measuring device may have various mounting means, depending on its intended use. For measuring outdoor light conditions in a garden, for example, the sunlight measuring device is ideally mounted on a stake that is insertable into the ground or into a flower pot filled with soil, with the sunlight collector lens pointing at the location of the noonday sun.

The sunlight measuring device according to the invention may also be used for many other purposes, and is not limited to use for determining the light conditions for growing plants. For example, a user may wear the sunlight measuring device for a period of time, as a pendant around the neck or pinned to clothing, to determine the amount of light the user is exposed to during the day. This may be useful in adjusting light conditions for a person suffering from seasonal adjusted disorder. The legends on the sunlight measuring device that explain the meanings of the individual light condition indicators may be adapted according to the use. For example, rather than "full sun", "partial sun", etc., the legends may use terms, such as, "abundant light", "average light", "low light", and "insufficient light," or other terms that are meaningful for the particular application.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 4 is a top plane view of the sunlight measuring device, showing the sunlight display panel with the four sunlight categories.

FIG. 5 is an elevational view of the sunlight measuring device.

DETAILED DESCRIPTION OF THE INVENTION

Figure 1:
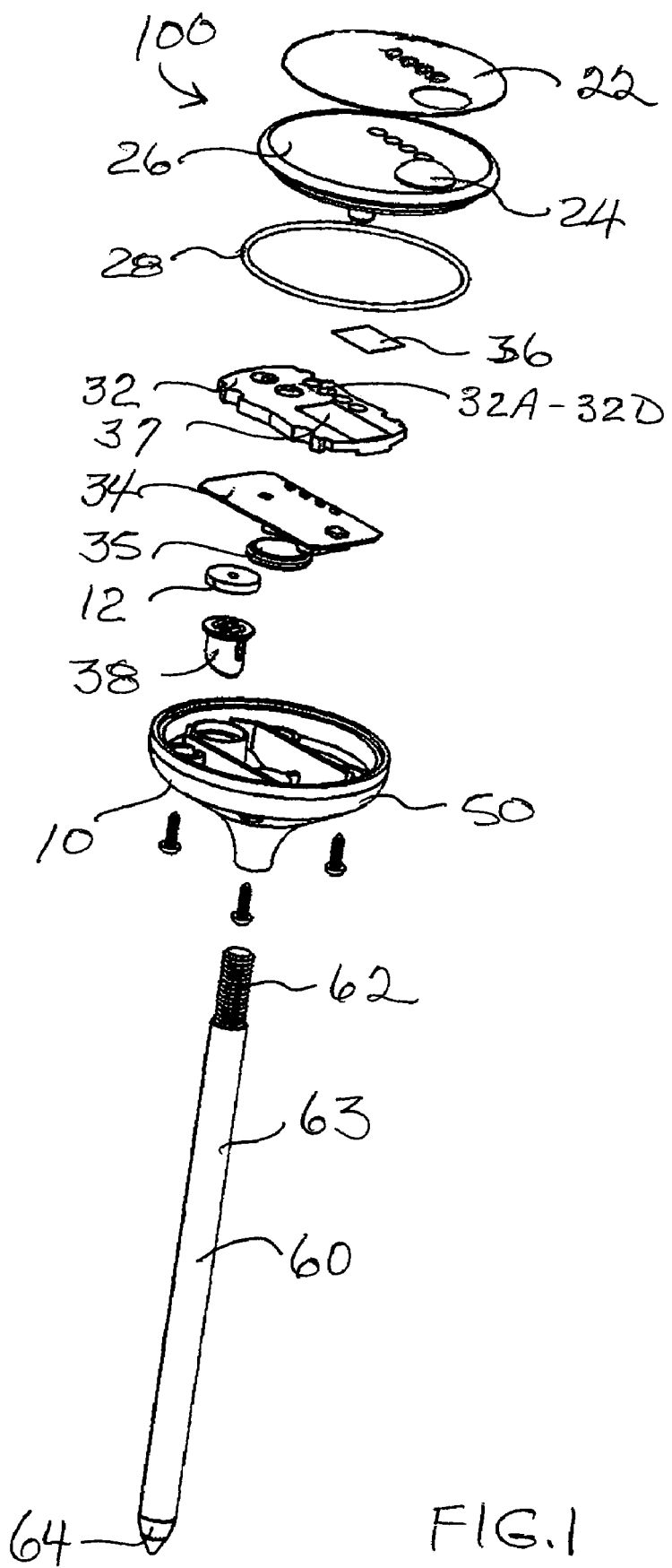
FIG. 1 is an exploded view of the internal components of the sunlight measuring device.

FIG. 1 shows the exploded assembly view of a sunlight measuring device 100 according to the invention, comprising a sunlight display panel 20, a sunlight measurement means 30, and a base 50.

The sunlight display panel 20 comprises a faceplate 22, a protective lens 26 that includes a sunlight collector lens 24 that allows sunlight to pass through to the sunlight measurement means 30, and four light condition indicators 25, which include a full sun indicator 25A, a partial sun indicator 25B, a partial shade indicator 25C, and a full shade indicator 25D. The sunlight display panel 20 is securely attached to the base 50, which together form a housing 10 for the sunlight measurement means 30, which includes a light filter 36 and a printed circuit board 34 mounted on a chassis 32 and a power source 35.

Figure 2:
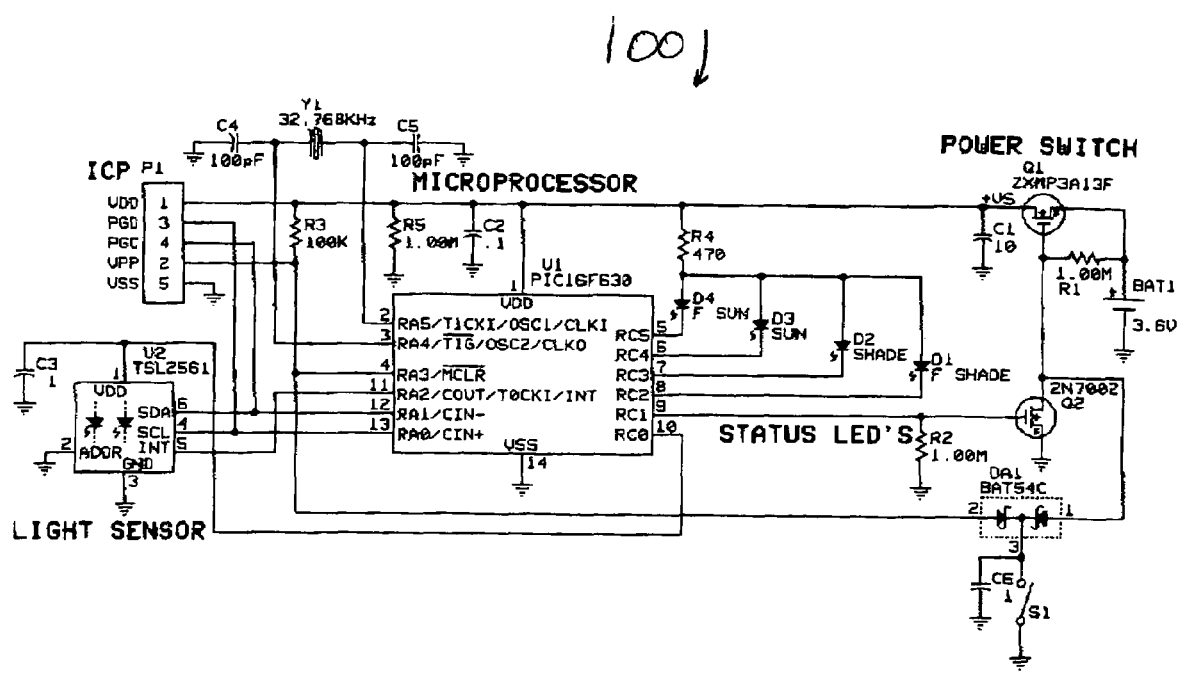
FIG. 2 is a circuit diagram of the sunlight measuring device according to the invention.
Figure 3A:
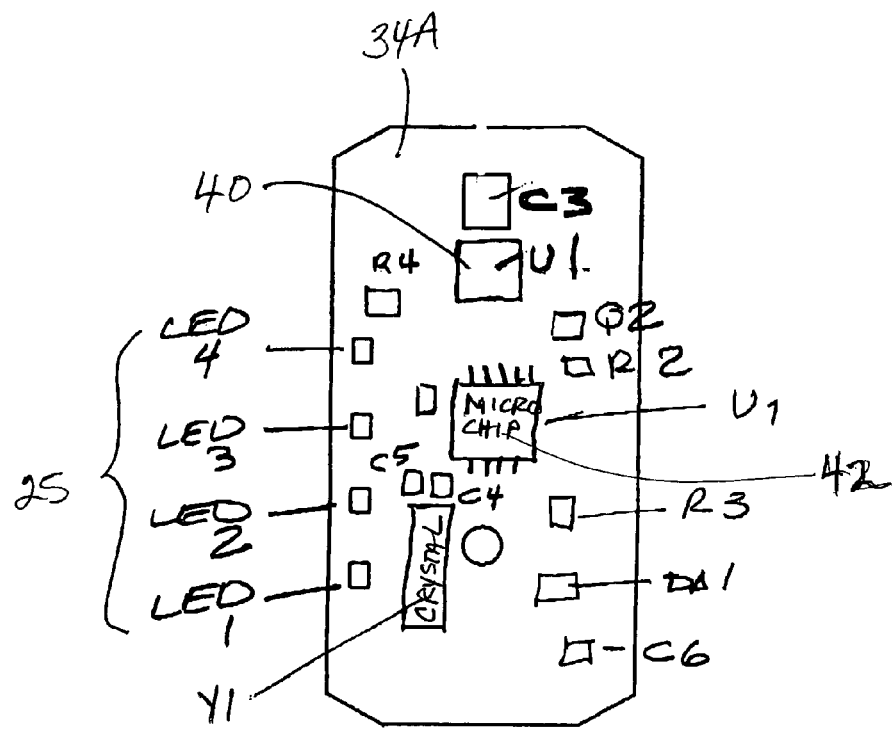
FIG. 3A is a plane view of a first side of the printed circuit board.
Figure 3B:
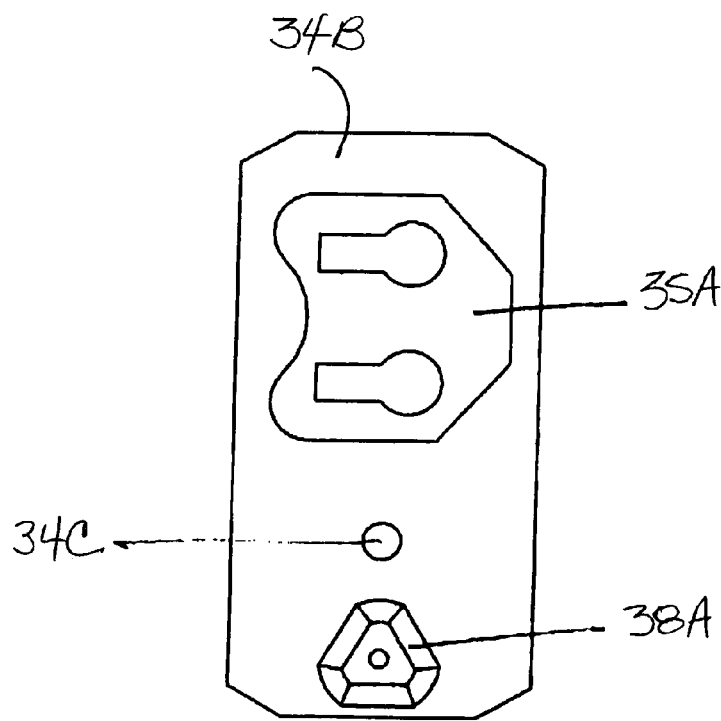
FIG. 3B is a plane view of a second side of the printed circuit board.

FIG. 2 is a schematic diagram of the electronic components of the sunlight measuring device 100. FIGS. 3A and 3B show the layout of the printed circuit board 34 and the various components mounted thereon. The printed circuit board 34 includes a light sensor 40, which collects sunlight and converts it into an electrical signal, the strength of the signal being in direct proportion to the intensity of the light falling on the face of the light sensor 40. The light sensor 40 may be a photoreceptive diode, such as manufactured by Texas Advanced Optoeletronic Solutions.

FIG. 3A shows a first side 34A and FIG. 3B shows a second side 34B of the printed circuit board 34. The light condition indicators 25, a programmable microchip V1, the light sensor 40, as well as electronic resistors, capacitors, and other circuitry components are shown mounted on the first side 34A. A retaining means 35A for holding the power source 35 is provided on the rear side 34B, as well as electrical contacts 38A for the on/off switch 38. A through-hole 34C through the printed circuit card 34 is used to mount the card to the chassis 32.

In the embodiment shown in the drawings, the four light condition indicators 25A-25D are light-emitting diodes. It is not intended, however, that this invention be limited to the use of light-emitting diodes to indicate the particular threshold of accumulated light achieved. Other suitable indicators include an analog display with a scale and needle, a color-changing window, or a bar that varies in height to indicate the level of accumulated light. The power source 35 provides power to the printed circuit board 34. Any suitable conventional battery, such as a rechargeable battery, a solar-powered battery, or conventional, non-rechargeable battery may be used as the power source 35. In the embodiment shown, a 3 volt lithium coin cell is used.

The chassis 32 and the power source 35 are mounted in the base 50. A translucent area 37 is provided on the chassis 32 for passing light from the sunlight collector lens 24 through to the light sensor 40. This translucent area 37 may be a clearly defined area on the chassis or the chassis may be molded from a translucent plastic that allows light to pass through it. The chassis 32 provides compressive stress protection to the circuit board 34. It also provides individual light separation for the four light condition indicators 25A-25D by means of four tunnels or apertures 32A-32D that prevent the illumination from one light condition indicator from causing a neighboring light condition indicator to appear illuminated. The chassis 32 may be compounded with a die comparable to that of the light filter 36 to block light waves outside of PAR range. Because the sun travels in an arc through the sky throughout the day, sunlight strikes and passes through the sunlight collector lens 24 to the light sensor 40 at varying angles throughout the day. The sunlight collector lens 24 has a dome shape, which effectively increases the surface that is illuminated by the rays of the sun as it travels throughout its arc, as the earth rotates through the day. The light from rays that are perpendicular to the curved surface of the dome are collected and measured by the sunlight collector lens 24. Thus, the lens collects and measures sunlight throughout the sunlight hours, not just when the sun is high overhead. This results in a more consistent illumination of the interior surface of the sunlight collector lens 24 than would be the case if the sunlight collector lens 24 were flat.

A light filter 36 is placed between the translucent area 37 on the chassis 32 and the sunlight collector lens 24. A suitable filter is a commercially available film in a very specific magenta color range that selectively passes only photosynthetically active radiation (PAR). The magenta filter is manufactured by Lee Filters and is a mylar/plastic film in the color #039 "Pink Carnation". Instead of providing a separate light filter component, it is also possible to allow the sunlight collector lens 24 or the translucent area 37 to perform the function of the light filter 36 by tinting the sunlight collector lens or translucent area 37 to the particular magenta color that matches the blockage range of the light filter 36.

The interior of the sunlight collector lens 24 passes light through to the translucent area 37. The light is diffused by the dome shape of the sunlight collector lens 24 and illuminates the translucent area 37 on the chassis 32. The sunlight collector lens 24, the light filter 36, and the translucent area 37 cooperate to diffuse the incoming light over the translucent area 37 and also effectively reduce the total amount of sunlight passed through to the light sensor 40, thereby decreasing the effect of the variation in the intensity of the sunlight throughout the day. The light sensor 40, mounted on the printed circuit board 34, senses the illumination on the underside of the chassis 32 in the translucent area 37. The sensor 40 and the operating program in the microchip V1 combined have a threshold that distinguishes between the illumination from direct sunlight falling on the lens 24 and decreased illumination from ambient light falling on the lens 24 when the sunlight measuring device 100 is in a shaded condition.

FIG. 4 is a top plane view of the sunlight display panel 20. Referring also to FIG. 1, the faceplate 22 contains legends that explain the meanings of the light condition indicators 25A-25D that differentiate the four light conditions. The faceplate 22 is preferably made from a clear film material such as mylar, with a clear adhesive on the reverse surface. In the particular embodiment shown, the faceplate 22 is assembled over the protective lens 26 and has a first cutaway area above the sunlight collector lens 24 and four clear areas above the four light condition indicators 25A-25D. The sunlight collector lens 24 protrudes through a cut-out in the faceplate 22. Illumination from the four light condition indicators 25A-25D is visible through the four clear areas. Rather than using a separate faceplate, it is also possible to provide legends that are etched or otherwise provided directly on the protective lens 26.

Figure 6:
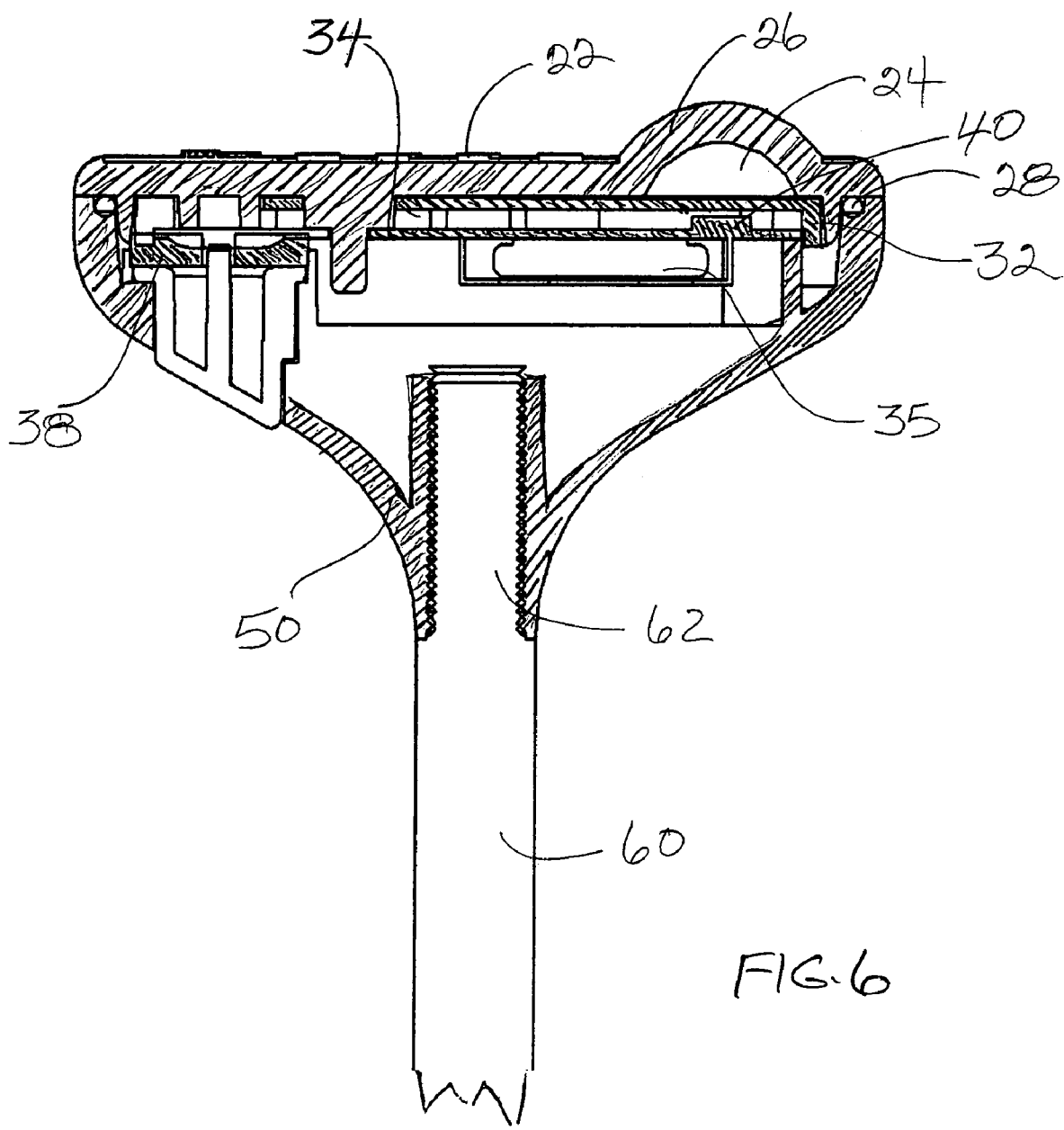
FIG. 6 a cross-sectional view of the sunlight measuring device, showing the placement of the inner components within the base.

FIG. 5 is an elevational view of the sunlight measurement means 100 according to the invention and FIG. 6 is a partial cross-sectional view, showing the arrangement of the various components within the housing 10, which is formed by the sunlight display panel 20 and the base 50. A seal means 28, such as an O-ring made of a compressive rubber or synthetic rubber material, may be used to provide a watertight seal between the base 50 and the sunlight display panel 20. An installation means 60 may be attached to the base 50. In the embodiment shown, the installation means is a stake 63 for mounting the sunlight measuring device 100 in the ground and has a threaded area 64 at the top for fastening to the base 50. Another suitable installation means 60 may be an adhesive backing for mounting the sunlight measuring device 100 on a rigid surface.

In the embodiment shown, the chassis 32, the printed circuit board 34, the protective lens 26, and the faceplate 22 are held together within the housing 10 by means of screws that pass through through-bores in the base 50 and thread themselves into hollow posts in the underside of the protective lens 26. The printed circuit board 34 and the faceplate 22 have cut-outs that fit around the threaded fasteners, thereby maintaining these elements in the proper orientation within the housing 10.

A washer 12 may placed between the underside of the printed circuit board 34 and the on/off switch 38 to provide waterproofing, cushioning and resistance to closing of the metal momentary dome switch on the underside of printed circuit board 6. The washer may be made of a rubber foam material. The on/off switch 38 protrudes out through the base 50 and when pushed upward contacts a metal dome switch 38A on the printed circuit board 34 to switch the sunlight measuring device 100 on or off.

A microprocessor 42 is mounted on the printed circuit board 34. The microprocessor 42 is a factory programmable microchip V1, such as the chip PIC-16F630-1/st produced by Microchip Technologies, Inc, Chandler, Ariz., and contains an algorithm that accumulates the electrical signal over the predetermined period and an internal clock set for a maximum time that corresponds to a predetermined period, which is typically 24 hours. The algorithm has thresholds for the accumulated signal, each threshold corresponding to one of the light condition indicators 25A-25D. When enough light is accumulated to reach a particular threshold, the light condition indicator 25 corresponding to that particular threshold is illuminated. In the embodiment shown, the light condition indicators 25 include: full shade indicator 25D, partial shad indicator 25C, partial sun indicator 25B, and full sun indicator 25A. The power source 35 provides the power for the electronic components.

Operation: Power is applied by pressing the on/off switch 35. At initial power up, the four light condition indicators 25A-25D light up sequentially until the microprocessor 46 has stabilized. All four light condition indicators 25A-25D flash for a few seconds, for example, once every 2 seconds, indicating that sunlight accumulation is in progress. Once the light sensor 40 has accumulated data for a predetermined accumulation period, for example, 12 hours, the single light condition indicator corresponding to the threshold of the accumulated sunlight flashes for a few seconds and remains illuminated thereafter, for a predetermined information period, such as, for 12 or 24 hours. During this information period, the light condition indicator may be set to flash every couple of seconds, or may be continuously illuminated. At the end of the accumulation period, the sunlight measuring device 100 ceases to accumulate light. In one embodiment, the sunlight measuring device 100 is programmed to have an accumulation period of 12 hours, an information period of an additional 12 hours, and to shut off at the end of the information period. It is, of course, possible, to provide the sunlight measuring device 100 according to the invention with an accumulation period of 24 hours and an information period of an additional 12 hours. The programmable microchip V1 may also be programmed to activate the corresponding light condition indicator 25 after an initial accumulation period, while the device is still in the process of accumulating light. At the end of the information period, for example, the sunlight measuring device 100 shuts off. No further indication of activity is shown. If the on/off switch 38 is pressed again, the last threshold of accumulated light is displayed by one of the four light condition indicators 25A-25D lighting up.

Described and illustrated herein is an sunlight measuring device to record and quantify, in generally accepted gardening terms, the amount of accumulated sunlight that falls on a specific site during a predetermined period. The sunlight measuring device is intended to aid gardeners and landscapers by helping them accurately place plants according to their physical light requirements.

It is understood that the embodiments described herein are merely illustrative of the present invention. It will therefore be appreciated by those skilled in the art, that the sunlight measuring device according to the invention may be used for other purposes than determining light conditions for gardening purposes, and that other modifications may be made to the present invention without deviating from its spirit and the scope as defined by the following claims.

What is claimed is:

1. A sunlight measuring device comprising:
   a sunlight measurement means for sensing incoming light at a particular site over a period of time and converting said incoming light to an electronic signal;
   a microprocessor that receives said electronic signal, determines a magnitude of said electronic signal and calculates an accumulated light value over said period of time, and compares said accumulated light value to threshold values that are programmed into said microprocessor;
   a plurality of light condition indicators, each single light condition indicator corresponding to a particular one of said threshold values; and
   a power supply;
   wherein, when said accumulated light value reaches one of said threshold values, said microprocessor causes a corresponding light condition indicator of said plurality of light condition indicators to be illuminated; and wherein said illuminated light condition indicator indicates a light condition that corresponds to one of several light conditions, said several light conditions being indicated in common gardening terms that include a full sun condition and a full shade condition.

2. The sunlight measuring device of claim 1, said sunlight measurement means comprising a sunlight collector lens, a light sensor, and a printed circuit board that includes said microprocessor;

wherein said incoming light is transmitted through said sunlight collector lens to said light sensor;

wherein said light sensor converts said incoming light into an electrical signal and transmits said signal to said microprocessor; and wherein said microprocessor determines a magnitude of said electrical signal and calculates an accumulated light signal and compares said accumulated light signal with a programmed series of threshold values.

3. The sunlight measuring device of claim 2, said sunlight measurement means further comprising a filter for passage of light that is within a wavelength range of photosynthetically active radiation and blocking passage of light that is outside of said wavelength range.

4. The sunlight measuring device of claim 3, wherein said filter is a magenta filter.

5. The sunlight measurement device of claim 2, said sunlight measurement means further comprising a chassis on which said printed circuit board is mounted, said chassis having a translucent area for allowing passage of light.

6. The sunlight measurement device of claim 2, wherein said light condition indicators are light-emitting diodes that are mounted on said printed circuit board.

7. The sunlight measurement device of claim 1, wherein said sunlight collector lens is a dome-shaped lens.

8. The sunlight measurement device of claim 1, wherein said sunlight collector lens diffuses incoming light.

9. The sunlight measurement device of claim 1 further comprising a protective housing that includes a sunlight display panel and a housing;

wherein said sunlight display panel provides visual access to said light condition indicators.

10. The sunlight measurement device of claim 9, said housing including an installation means.

11. The sunlight measurement device of claim 10, wherein said installation means is a stake that is insertable in a ground surface.

12. The sunlight measurement device of claim 10, wherein said installation means is an adhesive mount.

13. The sunlight measurement device of claim 1, wherein said several light conditions further include a partial sun condition.

14. The sunlight measurement device of claim 1, wherein said several light conditions further include a partial shade condition.

15. The sunlight measurement device of claim 1, wherein said period of time is 24 hours and said sunlight measurement means stops sensing light at the end of said period of time.

16. The sunlight measurement device of claim 15, wherein said light condition indicator remains illuminated for an additional period of time.

17. The sunlight measuring device of claim 16, wherein said additional period of time is 12 hours.

18. A sunlight measuring device comprising:

a sunlight measurement means for sensing incoming light at a particular site over a period of time, said sunlight measurement means comprising a sunlight collector lens, a light sensor, and a printed circuit board with a microprocessor;

a plurality of light condition indicators, each single light condition indicator corresponding to a particular one of said threshold values;

a power supply; and a chassis on which said printed circuit board is mounted, said chassis having a translucent area for allowing passage of said incoming light through said sunlight collector lens to said light sensor;

wherein said light sensor converts said incoming light into an electrical signal and transmits said signal to said microprocessor;

wherein said microprocessor calculates an accumulated light signal over time and compares said accumulated light signal with a series of threshold values that are programmed into said microprocessor;

wherein, when said accumulated light signal reaches one of said threshold values, said microprocessor causes a corresponding light condition indicator of said plurality of light condition indicators to be illuminated; and wherein said illuminated light condition indicator indicates a light condition that corresponds to one of several light conditions, in common gardening terms that include a full sun condition and a full shade condition.

* * * * *